Patented Dec. 13, 1938

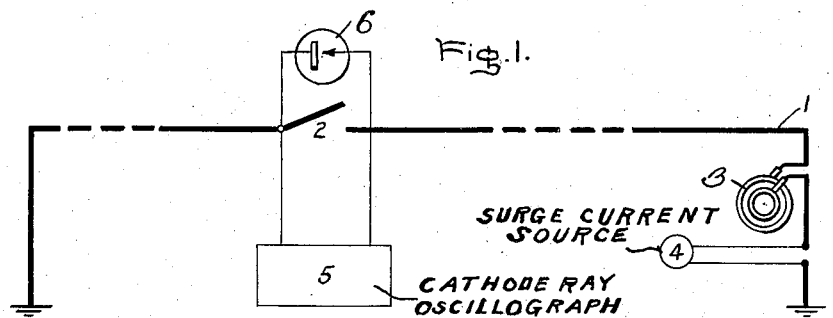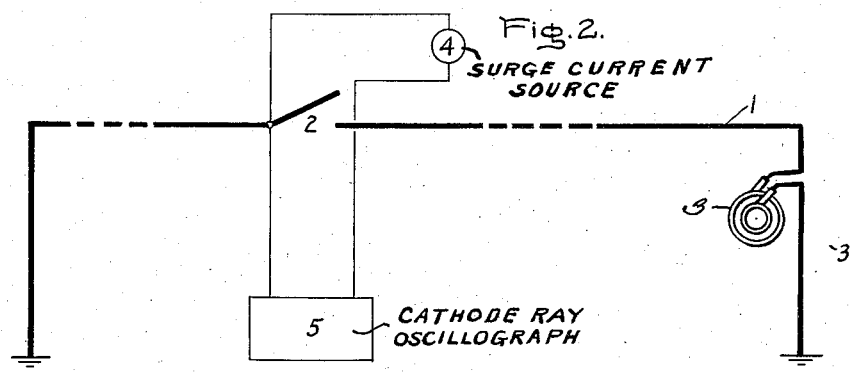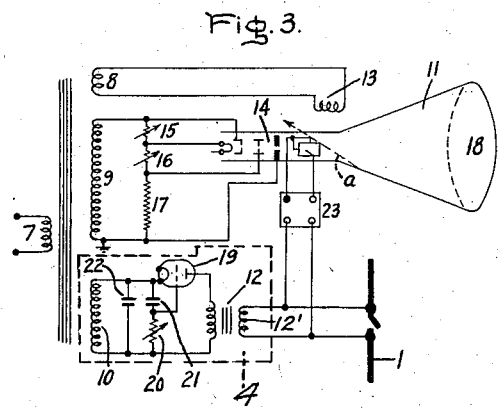

2,140,395

UNITED STATES PATENT OFFICE 2,140,395

TESTING OF ELECTRIC CIRCUITS

Henry Trencham, Kings End, Ruislip, and Kenneth James Rawcliffe Wilkinson, Rugby, England, assignors to General Electric Company, a corporation of New York Application November 21, 1936, Serial No. 111,990
In Great Britain October 31, 1935

5 Claims. (Cl. 175—183)

This invention relates to the testing of electric circuits by the application thereto of surge currents especially with a view to the determination of voltage behaviour. Where complex circuits are involved, it is frequently difficult to obtain the voltage reaction of such circuits to an applied surge current of a defined wave form and one object of the invention is to enable this to be done with simple apparatus without the necessity for determining circuit constants and then using complex calculation.

The method of testing an electric circuit with a view to the determination of its electrical characteristic according to the invention, consists in injecting into the circuit recurrent surge currents of controlled wave form and indicating the resultant voltage across points in the circuit by means of a cathode ray oscillograph, the beam control of which is similarly recurrent and so arranged that the resulting voltage across the points appears as a standing wave on the screen of the oscillograph. More particularly the invention relates to the testing of alternating current circuits to determine the restriking voltage which a circuit breaker has to withstand when installed in a given position in an electric circuit.

The relevant duration of restriking voltage surges which occur on any system on the opening of a circuit breaker is normally not greater than about 10% of the normal cycle (assuming 50 cycles).

A further object of the invention is to obtain a recurrent testing current surge which closely represents in shape during this period that of the current which is, in effect, to be opened by the circuit breaker, i. e. $a \sin \omega t$ when $a$ is the crest value of the current $\omega$ is $2\pi$ times the frequency, and the expression has zero value until its commencement when time $t$ is zero.

The reason for this course is given by the principle of superposition from which it follows that if a voltage results from suppressing current in a given circuit, then an equal voltage is obtained when current of the same amplitude and shape but of opposite sign is injected into that circuit and at the same terminals.

The invention further consists in the use for obtaining this recurrent testing surge current of a mutual inductance to the primary of which is applied a recurring voltage of a shape $b \cos \omega t$ which has zero value until its commencement when time $t$ is zero.

In carrying out the invention for determining the restriking voltage duty of circuit breakers, the testing surge current may be applied to the system to be tested across the open terminals of a circuit breaker and the resulting voltage surge is then measured across the breaker terminals by means of a high speed cathode ray oscillograph.

In alternating current-circuit breakers the interruption of the circuit takes place at or close to the time when the current passes through a zero value and it is known that the performance of a circuit breaker is very much influenced by the rate at which the restriking voltage rises across its terminals at this time of current zero. For successful circuit interruption, insulation value must be built up between the breaker contacts at a rate which will prevent the restriking voltage from bridging the arcing space and restarting the flow of current.

It is important that the designers of circuit breakers should know the nature of the restriking voltage which occurs at any point where a breaker is installed and the present invention enables such rate of rise to be ascertained.

Hitherto means employed for determining the rate of rise of restriking voltage have been limited to cathode ray oscillograms taken when interrupting fault current, usually in a specially equipped testing station with a particular form of testing circuit or, alternatively, to calculation, for the making of which there must be known the values of circuit constants, i. e. capacitances and inductances associated with the system at the point where the circuit breaker is located.

The former method is not economically feasible for obtaining information on system conditions in general and the latter, apart from the tediousness of making the calculation, depends on the accuracy with which lumped constants can be measured or assumed for each particular case.

In accordance with the present invention it is proposed and preferred to measure directly the restriking voltage surge at any point on a system at which a circuit breaker is installed or is to be installed, by injecting recurrent surge currents into the system at the open terminals of the breaker, and measuring the resulting voltage across the breaker terminals by means of a cathode ray oscilolgraph controlled as hereinbefore specified.

An alternative proposed testing method is based upon the interruption of a current wave shaped as that which actually occurs before the breaker is opened, and consists in injecting at the normal source of energy of the system (e. g. the alternator) or at some point clear of the parameters effecting immediately the shape of the restriking surge, alternating current of a suitably low voltage. Across the breaker is connected a half wave rectifier which represents the breaker opening 50 times per second (on 50 cycle operation) and an oscillograph is used to indicate the resulting voltage. An advantage of the invention is that this oscillograph may be of the low voltage type adapted for examining recurrent surges in such a manner as to leave an apparently persistent visual record of the voltage shape. This method has the disadvantage that access is needed not only to the breaker but also to the alternator or to some point remote from where the indication is to take place.

In the preferred method which uses the principle of superposition, recurrent surge currents are injected into the system and the surge voltages pictured on the screen of a cathode ray tube. The recurrent surge currents may be obtained by applying to the primary of the mutual inductance a section of an alternating current voltage of sine wave form the desired section being selected by a grid controlled arc discharge device which is "triggered" into operation at each instant of the cycle of the applied alternating current when the voltage is at its crest value.

This triggering may be effected by means of a suitable combination of capacitance and resistance included in the grid circuit of the discharge device.

The mutual inductance may consist of a transformer having a low self-capacity across both its primary and secondary windings, and the primary winding is preferably shielded and the core earthed.

To those skilled in the art, it will be apparent that to obtain current surges of the desired shape the following conditions must be met.

(1) The impedance of the circuit under test must be small compared with that of the mutual inductance referred to the secondary winding, and (2) The effective winding resistances must be small compared with their inductive reactance at power frequency.

Condition (1) is met by so proportioning the mutual inductance that $$\frac{2L_0}{L_2(1-K^2)}$$

is small. For example, a preferred upper limit is .02, where $L_0$ is the inductance of the test circuit, $L_2$ the inductance of the secondary winding of the mutual inductance, and K the mutual flux coupling factor.

The accompanying drawing shows in Figs. 1 and 2 two methods whereby the invention may be used for testing circuits for determining the duty of circuit breakers, while Fig. 3 shows a circuit arrangement embodying a cathode ray tube, for generating and examining the recurrent surge currents and voltage respectively.

In Fig. 2, 1 represents a circuit to be tested for determining the duty of a circuit breaker 2, the circuit including a generator 3 and being earthed at each end. 4 indicates a source of recurrent surge currents being connected across the open terminals of the breaker 2 in Fig. 2. 5 designates a cathode ray oscillograph connected across the open terminals of the circuit breaker 2 and controlled so that the recurring surge voltages across the breaker terminals appear at a standing wave on the screen thereof.

In Fig. 1 where alternating voltage is applied to the circuit at a point remote from the breaker, the breaker has connected across it a half-wave rectifier 6 which represents the breaker opening regularly at a frequency corresponding to the frequency at which alternating voltage is applied to the system, say 50 cycles where an ordinary commercial supply is used.

Turning now to a consideration of Fig. 3, we have at 7 the primary winding of a transformer which is supplied with alternating current of commercial frequency and voltage, say 250 volts 50 cycles: The transformer has three secondary windings 8, 9 and 10 of which 8 controls the scanning of the beam of a cathode ray oscillograph 11 along the time axis, 9 supplies control potentials for the beam of the oscillograph, 10 supplies an alternating current of controlled wave form to the primary of a mutual inductance 12 indicated as a transformer, the secondary winding 12' of which is connected to inject the recurrent surge currents into the circuit under test.

The secondary winding 8 is connected to the scanning coil 13 of the oscillograph so as to deflect the beam produced by the electron gun 14 of known construction across the screen 18 fifty times per second. The magnetic axis of the coil 13 is indicated by the interrupted line $a$.

One end of the secondary winding 9 is connected to the second accelerator of the oscillograph and earthed. The other end of winding 9 is connected to the beam control electrode of the oscillograph and the winding 9 is shunted by resistors 15, 16 and 17 the junction between 15 and 16 being connected to the control electrode of the oscillograph, while the junction between 16 and 17 is connected to the anode or first accelerator of the oscillograph. As the accelerating electrodes are periodically made negative with respect to the cathode, the beam is suppressed during alternate half-cycles of the applied alternating current so that the beam only traces a path on the screen during the remaining half-cycles.

The secondary winding 10 is connected to energize the primary winding of the mutual inductance 12 through a controlled arc discharge device 19 which is periodically rendered conductive by the control of the control grid through a resistance condenser combination 20, 21 connected across winding 10. The values of condenser 21 and of resistance 20 are so chosen that the device 19 is rendered conductive at the crest of the supply voltage wave applied to primary winding 7. To the primary of mutual inductance 12 is thus applied a recurrent voltage $b \cos \omega t$ where $t$ is measured from zero, and the resulting output current of the secondary winding of 12 is a surge current of form $a \sin \omega t$ where $t$ is measured from zero.

The mutual inductance 12 is designed to have no interwinding capacity by providing effective screening between the primary and secondary windings, e. g. by providing metal foil coverings over the primary winding, care being taken not to allow a complete short-circuited turn. If more than one secondary voltage is desired the primary and/or secondary may be tapped, though it is preferred to use interchangeable coils.

The resulting surge voltage across the open points of the circuit under test is applied to the beam deflecting plates of the oscillograph preferably through an amplifier 23. Owing to the supply being taken from a common transformer the deflecting voltage across the plates is so timed with respect to the time deflection of the beam obtained from coil 13 that recurring deflections of the beam are superposed and the resulting trace on the screen appears as a standing wave thereon, and this trace may be readily examined and photographed if desired.

What we claim as new and desire to secure by Letters Patent of the United States is:

1. The method of testing an electrical circuit that may be broken, which consists in connecting the secondary of a mutual inductance across the break and applying to the primary of the mutual inductance by means of a grid controlled gas discharge tube, voltage of form $b \cos \omega t$ from a source of alternating voltage of crest value $b$, by so controlling the discharge tube that conduction commences at times of voltage maxima; the mutual inductance being so apportioned in relation to the circuit under test that surge currents derived from its secondary winding are not unduly distorted by their traversal of the test circuit.

2. The method of testing an electric circuit without any normal current supply source in operation, said electric circuit having a break therein, which method consists in applying to the circuit an alternating current of controlled wave form, and connecting across the break in the circuit a half wave rectifier and a beam control circuit of a cathode ray oscillograph, the other beam control circuit of the oscillograph being synchronized with the applied alternating current so that the resulting surge voltage across said points appears as a standing wave on the screen of the oscillograph.

3. Apparatus for testing a circuit without any normal current supply source in operation, the circuit being one which may be broken, which apparatus comprises a surge generator for connection in series with the circuit to apply surge currents, a half-wave rectifier connected across a break in the circuit, and means for observing the resultant wave form of the voltage which appears across the break.

4. In combination, a circuit to be tested including a current supply source and having a break therein, a half-wave rectifier connected across said break, means for applying in series with said circuit recurring surges of current having a wave form corresponding to that of current caused to flow in the circuit by said source when the circuit is unbroken, and means for observing the resultant wave form of the voltage which appears across the break.

5. Apparatus for testing a circuit which may be broken, which apparatus comprises a mutual inductance having a primary winding and a secondary winding for connection across a break in the circuit, a source of alternating current, a discharge tube connecting said source to said primary winding, means for controlling the discharge tube so that conduction commences at times of voltage maxima, the mutual inductance being of such a value that the fraction $$\frac{2L_0}{L_2(1-K^2)}$$

is substantially no greater than .02 where $L_0$ is the inductance of the said circuit to be tested, $L_2$ is the inductance of the secondary winding of the mutual inductance and —$K$— is the mutual flux coupling factor of the mutual inductance.

HENRY TRENCHAM.
KENNETH JAMES
RAWCLIFFE WILKINSON.